United States Patent
Wong

(10) Patent No.: US 7,930,334 B1
(45) Date of Patent: Apr. 19, 2011

(54) GAIN CONTROL CODING WITHIN PROPORTIONAL-INTEGRAL-DERIVATIVE FILTERS FOR CONTROL-LOOP APPLICATIONS

(75) Inventor: Hee Wong, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 1051 days.

(21) Appl. No.: 11/731,962

(22) Filed: Apr. 2, 2007

Related U.S. Application Data

(63) Continuation of application No. 11/506,189, filed on Aug. 16, 2006.

(51) Int. Cl.
*G06F 17/10* (2006.01)
(52) U.S. Cl. .................................................. 708/300
(58) Field of Classification Search .......... 708/300–323; 700/40–43
See application file for complete search history.

(56) References Cited

U.S. PATENT DOCUMENTS

| | | | |
|---|---|---|---|
| 5,394,322 A | 2/1995 | Hansen | |
| 5,754,424 A | 5/1998 | Melvin | |
| 2002/0040250 A1* | 4/2002 | Gaikwad et al. | 700/37 |
| 2004/0153173 A1 | 8/2004 | Chang et al. | |

OTHER PUBLICATIONS

Angel V. Peterchev et al., "Quantization Resolution and Limit Cycling in Digitally Controlled PWM Converters," IEEE Transactions on Power Electronics, vol. 18, No. 1, Jan. 2003, pp. 301-308.
Christian Kranz, "Complete Digital Control Method for PWM DCDC Boost Converter," 2003 IEEE, pp. 951-956.
Siew Kuok Hoon et al., "A Low-Power Digital PWM DC/DC Converter based on Passive Sigma-Delta Modulator," 2005 IEEE, pp. 3873-3876.
Aleksandar Prodic et al., "Digital PWM Controller and Current Estimator for a Low-Power Switching Converter," 2000 IEEE, pp. 123-128.
Office Action dated Jul. 15, 2010 in connection with U.S. Appl. No. 11/506,189.

* cited by examiner

*Primary Examiner* — Tan V Mai

(57) ABSTRACT

Proportional, integral and derivative error gains within a proportional-integral-derivative filter are selected based on a magnitude of the error value and with successively higher gain values corresponding to larger ranges of error values. Coding of the error gains is selected based on one or more of: large code-dynamic-range to achieve good transient and quiescent responses; small code-step ratio to achieve smooth transitions between consecutive steps; large gain control range to satisfy the differing gain coverage requirements of the three proportional, integral and derivative error; positive and negative code symmetry with small step increment about zero; reservation of code space for dead band elimination; allocation of code space to prevent overflow/underflow during multiplying and bit-shifting; and minimum cost and power.

23 Claims, 6 Drawing Sheets

GAIN CONTROL CODING WITHIN PROPORTIONAL-INTEGRAL-DERIVATIVE FILTERS FOR CONTROL-LOOP APPLICATIONS

CROSS-REFERENCE TO RELATED APPLICATIONS

This application is a continuation of U.S. patent application Ser. No. 11/506,189 filed on Aug. 16, 2006. The content of the above-identified application is hereby expressly incorporated by reference.

TECHNICAL FIELD OF THE INVENTION

The present invention is directed, in general, to error signal processing for control loop applications and, more specifically, to gain control coding for proportional-integral-derivative filters in a control loop.

BACKGROUND OF THE INVENTION

Digital control loops in control systems such as switching power supplies, servo loops and robotic controllers may include a proportional-integral-derivative (PID) filter. Selection of the gain to apply to error values within a proportional-integral-derivative filter can impact a variety of architectural and performance factors for the control loop, including transient and quiescent response, transitions between consecutive steps, gain coverage, positive and negative code symmetry, step increment size near zero, code space and allocation, cost and power.

There is, therefore, a need in the art for an improved technique of setting error gain within a proportional-integral-derivative filter for digital control loops.

SUMMARY OF THE INVENTION

To address the above-discussed deficiencies of the prior art, it is a primary object of the present invention to provide, for use in control loops, proportional, integral and derivative error gains within a proportional-integral-derivative filter that are selected based on a magnitude of the error value and with successively higher gain values corresponding to larger ranges of error values. Coding of the error gains is selected based on one or more of: large code-dynamic-range to achieve good transient and quiescent responses; small code-step ratio to achieve smooth transitions between consecutive steps; large gain control range to satisfy the differing gain coverage requirements of the three proportional, integral and derivative error; positive and negative code symmetry with small step increment about zero; reservation of code space for dead band elimination; allocation of code space to prevent overflow/underflow during multiplying and bit-shifting; and minimum cost and power.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

Figure 1:
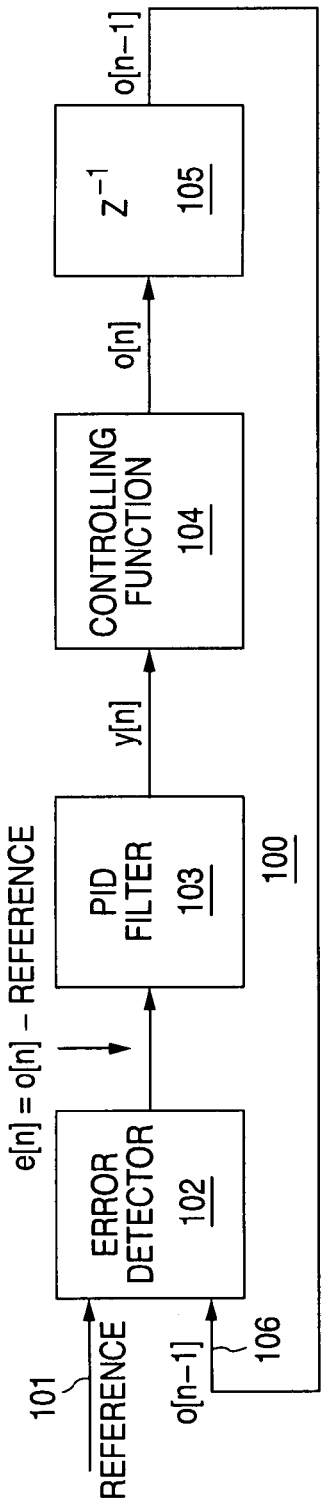
FIG. 1 is a high level block diagram of a control loop within which error gain for a proportional-integral-derivative (PID) filter may be controlled according to one embodiment of the present invention.

FIG. 1 is a high level block diagram of a control loop within which error gain for a proportional-integral-derivative (PID) filter may be controlled according to one embodiment of the present invention. System 100 includes an input 101 for receiving a reference level signal at an error detector 102. An error signal e[n] computed as the difference between the reference level signal Reference and a feedback signal o[n−1] is produced by the error detector 102 and forwarded to a PID filter 103. PID filter 103 filters the error signal e[n] and forwards the filtered error signal y[n] to a controlling unit 104, which produces a control signal o[n]. The control signal o[n] is latched by a flip-flop 105 to produce a feedback signal o[n−1] returned to a feedback input 106 of the error detector 102. The control loop thus applies the filtered error correcting signal y[n] and modifies the loop output o[n] to minimize the magnitude of the error signal e[n].

Those skilled in the art will recognize that a complete system is not depicted in FIG. 1 or described herein. Instead, only so much of a system involving use of a PID filter as is unique to the present invention or necessary for an understanding of the present invention is depicted and described herein.

Figure 2:
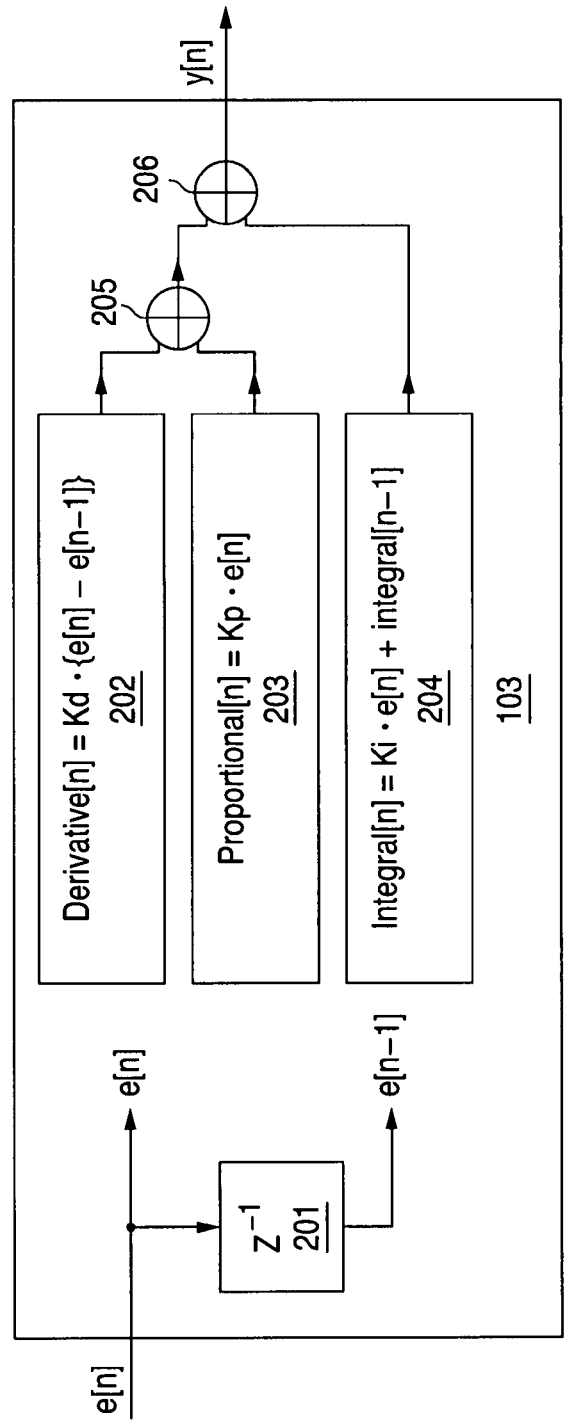
FIG. 2 is a high level block diagram of the general topology for a proportional-integral-derivative filter as depicted in FIG. 1.

FIG. 2 is a high level block diagram of the general topology for a PID filter. PID filter 103 receives the error signal e[n] at an input thereof and latches the error signal e[n] in flip-flop 201 to retain a previous error signal e[n−1]. Both the error signal e[n] and the retained error signal e[n−1] are then routed as necessary within PID filter 103.

A derivative unit 202 within PID filter 103 computes the product of a loop-gain constant Kd times the sum of the error signal e[n] and the retained error signal e[n−1]. A proportional unit 203 within PID filter 103 computes the product of a loop-gain constant Kp times the error signal e[n]. An integral unit 204 within PID filter 103 computes the product of a loop-gain constant Ki times the sum of the error signal e[n] plus a retained state variable integral[n−1] (where integral[n] is the state variable). These signals are added by sum units 205 and 206 to produce the filtered error signal:

$$y[n]=Kd\cdot\{e[n]-e[n-1]\}+Kp\cdot e[n]+Ki\cdot e[n]+\text{integral}[n-1].$$

PID filter 103 is preferably, but not necessarily, implemented as a multiplexed digital PID (Mux-PID) filter as disclosed in the related application identified above. The output of the Mux-PID is a 10-bit control signal, by which the Mux-PID drives a digital pulse width modulator including a dither circuit as described in U.S. patent application Ser. No. 11/204,297 entitled DITHER SCHEME USING PULSE-DENSITY MODULATION (DITHER PDM) and filed Aug. 14, 2005 and a dead-time eliminating circuit of the type described in U.S. patent application Ser. No. 11/204,284 entitled DIGITAL DEAD-TIME CONTROLLER FOR PULSE WIDTH MODULATORS and filed Aug. 14, 2005, which are incorporated herein by reference.

The error value e[n] may be scaled and/or remapped within PID filter 103, providing variable gain. Coding for control of the gain Kx=Kd, Kp or Ki (e.g, by a multiplier and Amap unit as disclosed in the related application identified above) may be illustrated by the following:

```
// adc[n] is the 4-bit output (16 levels, ±1 to ±8) from the Controller-
   ADC.
// The quantization voltages for these levels are show in TABLE III.
// The 3 magnitude bits of adc[n] become abs(e[n]) after code con-
   version in Amap.
// There are 8 code-steps for abs(e[n]).
// Note: abs(adc[n]) = absolute value of adc[n]
switch (abs(adc[n]))  // check the output from the Controller-ADC
{ // magnitude only, no sign         // ADC input (mVolt):
```

-continued

```
case 1: abs(e[n]) = 0; break;       // 0 to 2
case 2: abs(e[n]) = 1; break;       // 2 to 3.5
case 3: abs(e[n]) = 2; break;       // 3.5 to 6.2
case 4: abs(e[n]) = 4; break;       // 6.2 to 10.9
case 5: abs(e[n]) = 7; break;       // 10.9 to 19.3
case 6: abs(e[n]) = 11; break;      // 19.3 to 34
case 7: abs(e[n]) = 16; break;      // 34 to 60
case 8: abs(e[n]) = 20; break;      // 60 to inf.
}
// Note: abs(Kx_e[n]) = absolute value of Kx.e[n]
abs(Kx_e[n]) = Kx * abs(e[n]);       // calculate abs(Kx.e[n])
if (abs(Kx_e[n]) > 255)              // check overflow
{ abs(Kx_e[n]) = 255;                // apply limit
}
```

It should be noted that the magnitude of the error value scales across the range of possible error values, and is also remapped so that different portions of the range map to different size error value steps. The magnitude of error e[n]=4, for example, corresponds to a range of signals starting at 6.2 mV and extending 4.7 mV (to 10.9 mV), while the magnitude of error e[n]=16 corresponds to a range of signal starting at 34 mV and extending 26 mV (to 60 mV).

Alternate code steps for gain control may be selected based on one or more of: large code-dynamic-range to achieve good transient and quiescent responses; small code-step ratio to achieve smooth transitions between consecutive steps; large Kx control range to satisfy the gain coverage of the three PID gain controls (Kd, Kp and Ki); positive and negative code symmetry with small step increment about zero; reservation of code space reserved for eliminating dead-band (see below); allocation of code space to prevent overflow/underflow during multiplying and bit-shifting; and minimum cost and power.

Since the target hardware is low-cost and low-resolution, the small available code space makes the majority of these criteria mutually exclusive. With compromises, however, many useful code-step combinations remain possible, such as:

| | |
|---|---|
| 0-1-2-4-7-11-16-20 | (best compromise, minor overflow, 70 AND-OR product terms) |
| 0-1-2-4-8-12-16-18 | (big jump from 4 to 8, minimum hardware, 46 AND-OR product terms) |
| 0-1-2-4-8-12-16-24 | (good dynamic range, some overflow, 56 AND-OR product terms) |
| 0-1-2-4-8-16-24-32 | (excellent dynamic range, heavy overflow, 49 AND-OR product terms) |

These code-step examples exhibit some performance differences and each may be a good choice for different requirements or applications.

An exemplary listing of possible values for the output abs(Kx·e[n]) of scaled error values based on remapped Controller ADC output abs(e[n]) using code steps 0-1-2-4-7-11-16-20 is given in TABLE III below:

TABLE III

|   | 0   | 1  | 2  | 3  | 4  | 5   | 6   | 7   | 8   | 9   | 10  | 11  | 12  | 13  | 14  | 15  |
|---|-----|----|----|----|----|-----|-----|-----|-----|-----|-----|-----|-----|-----|-----|-----|
| 20 | 100 | 20 | 40 | 60 | 80 | 100 | 120 | 140 | 160 | 180 | 200 | 220 | 240 | 255 | 255 | 255 |
| 16 | 80  | 16 | 32 | 48 | 64 | 80  | 96  | 112 | 128 | 144 | 160 | 176 | 192 | 208 | 224 | 240 |
| 11 | 55  | 11 | 22 | 33 | 44 | 55  | 66  | 77  | 88  | 99  | 110 | 121 | 132 | 143 | 154 | 165 |
| 7  | 35  | 7  | 14 | 21 | 28 | 35  | 42  | 49  | 56  | 63  | 70  | 77  | 84  | 91  | 98  | 105 |
| 4  | 20  | 4  | 8  | 12 | 16 | 20  | 24  | 28  | 32  | 36  | 40  | 44  | 48  | 52  | 56  | 60  |
| 2  | 10  | 2  | 4  | 6  | 8  | 10  | 12  | 14  | 16  | 18  | 20  | 22  | 24  | 26  | 28  | 30  |
| 1  | 5   | 1  | 2  | 3  | 4  | 5   | 6   | 7   | 8   | 9   | 10  | 11  | 12  | 13  | 14  | 15  |
| 0  | *   | *  | *  | *  | *  | *   | *   | *   | *   | *   | *   | *   | *   | *   | *   | *   |

Within TABLE III, the first column (outside the box) lists possible values for the remapped Controller ADC output abs(e[n]) and the first row (also outside the box) lists possible values for the programmable gain input Kx (either Kd, Kp or Ki). The values inside the box are corresponding values abs (Kx·e[n]) of the output of multiplier 234. The first column of values inside the box (i.e., 100, 80, 55, etc.) lists optional power-up values for Kp, while the last three values for the first row within the box (all 255) represent an overflow condition. The last row inside the box represents the dead band, discussed further below.

Figure 3:
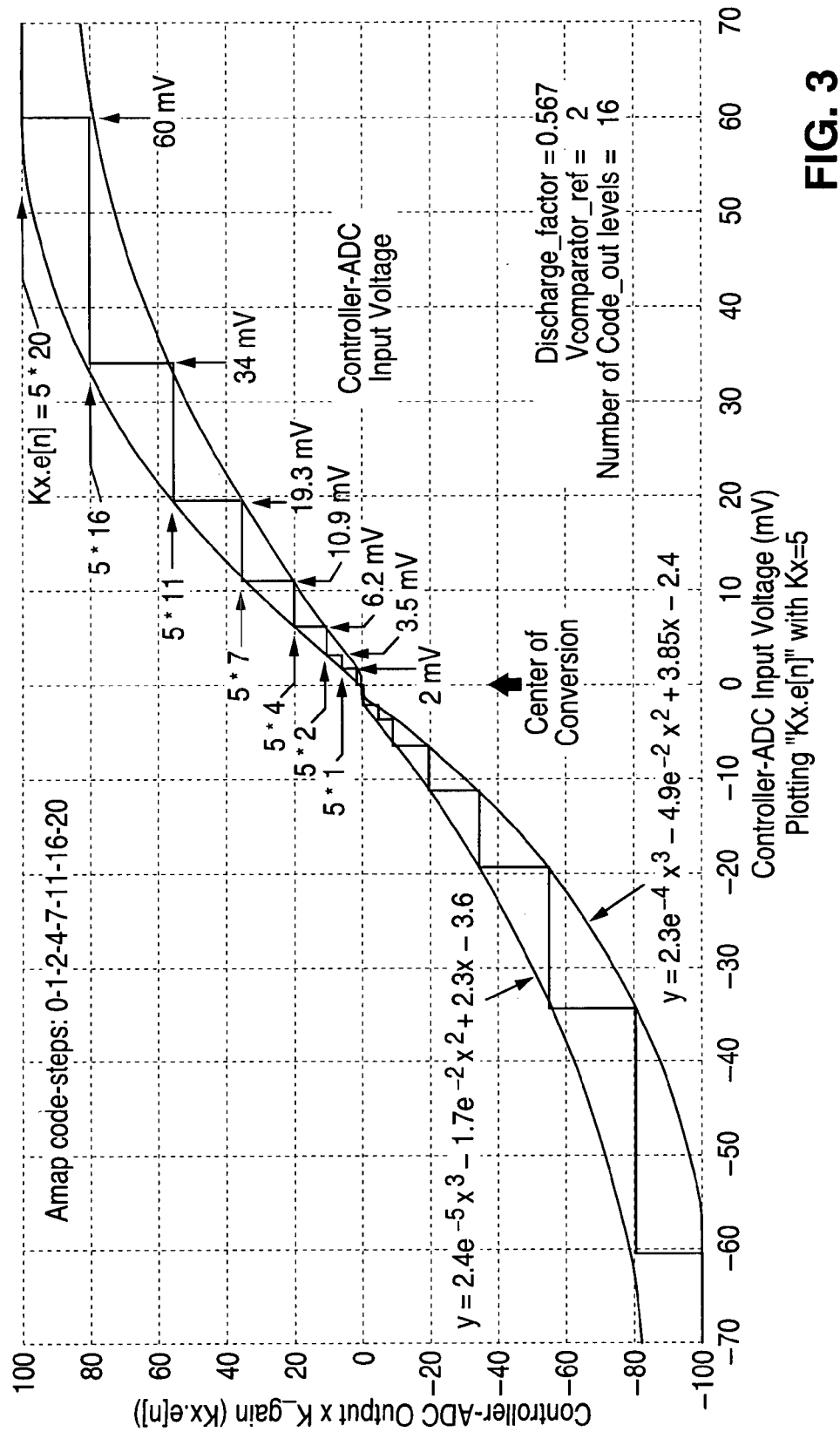
FIGS. 3, 4 and 4A are plots for the scaled filtered error signal portion computed within a multiplexed digital PID filter employing coding according to one embodiment of the present invention.
Figure 4:
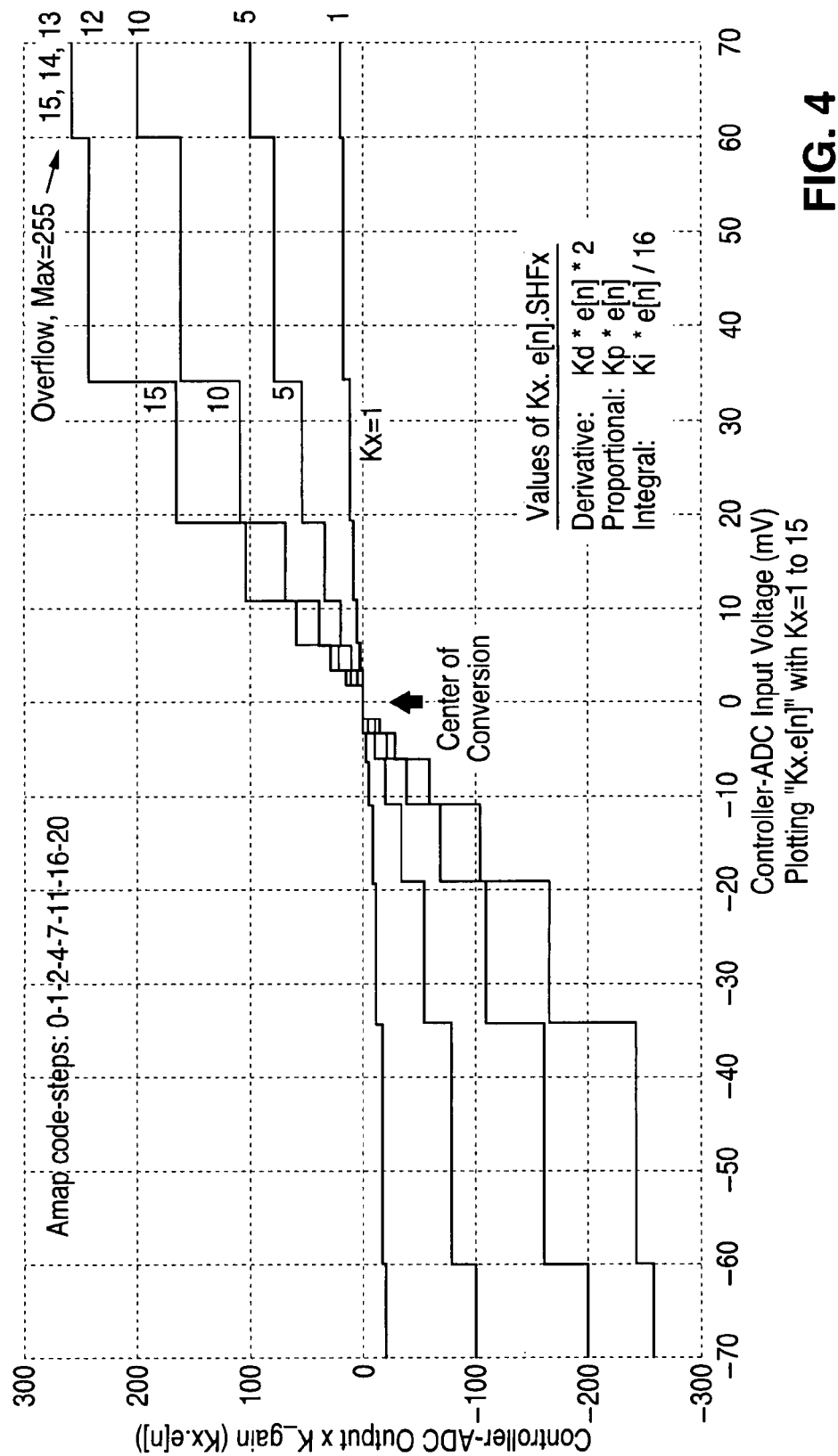
Figure 4A:
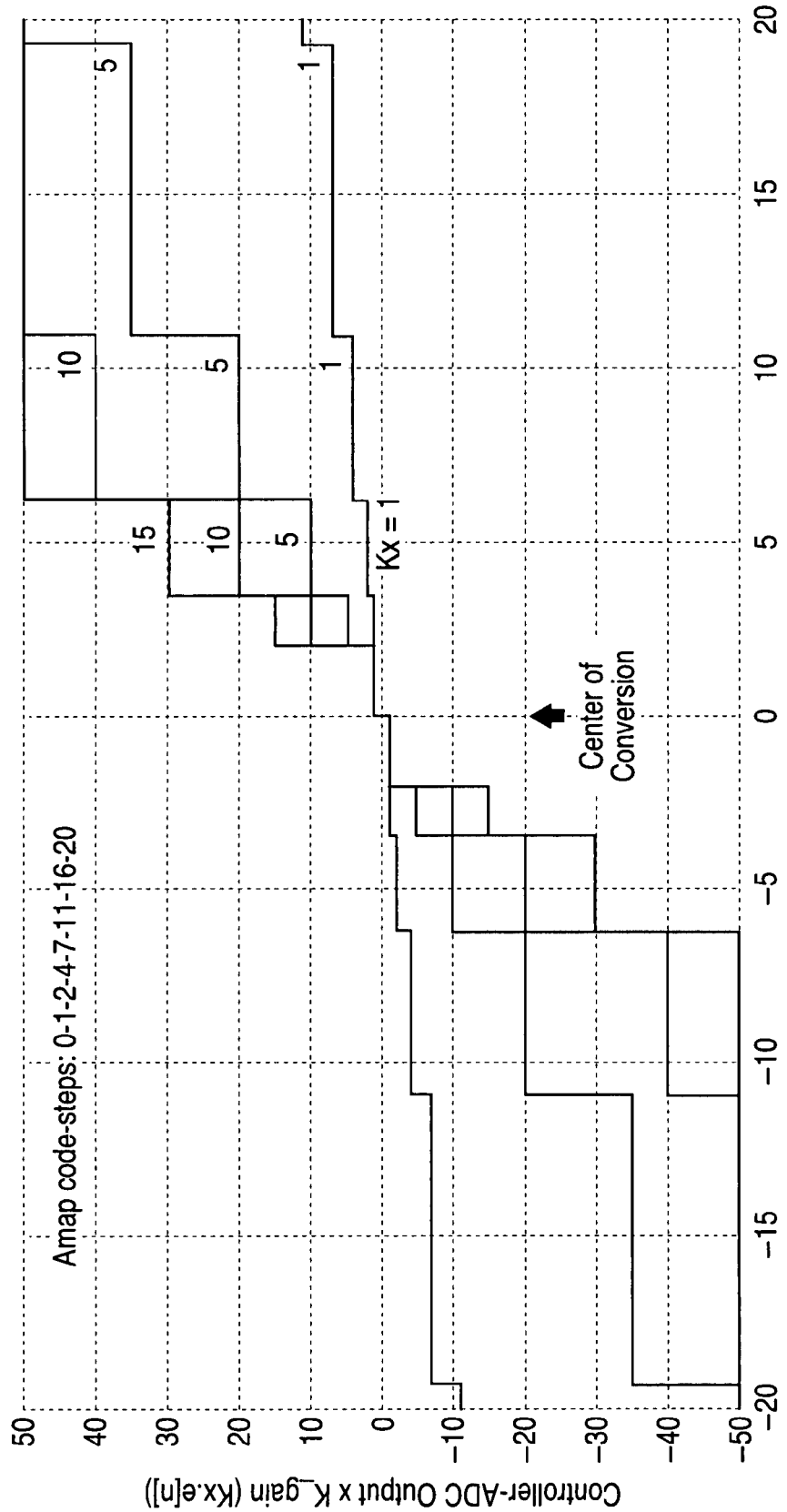

FIGS. 3, 4 and 4A are plots for the scaled filtered error signal portion computed during a given state within a multiplexed digital PID filter employing coding according to one embodiment of the present invention. FIG. 3 is a plot of the scaled, filtered signal ±Kx·e[n] for Kx=5 as a function of the Controller ADC input voltage. FIG. 4 is a plot of the scaled, filtered signal ±Kx·e[n] as a function of the Controller ADC input voltage for Kx=1 through Kx=15. FIG. 4A is an enlarged view of a portion of FIG. 4.

Figure 5A:
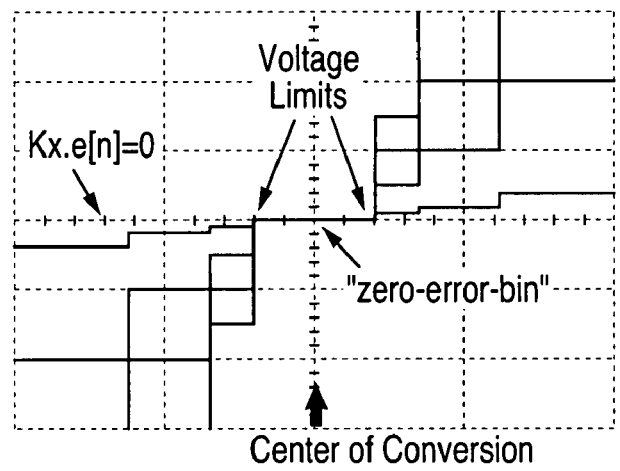
FIGS. 5A and 5B illustrate the dead band effect and two approaches to eliminating the dead band.
Figure 5B:
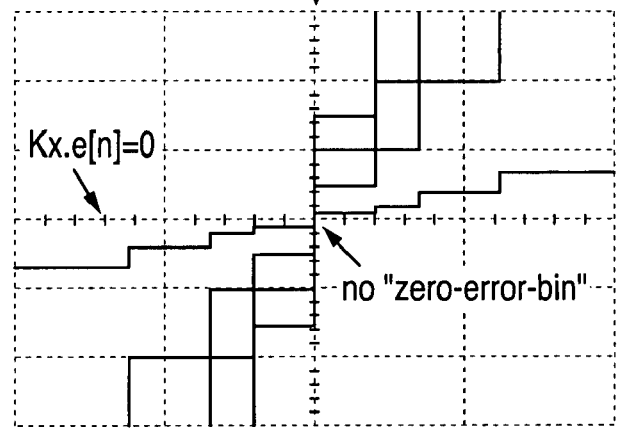

As noted above, gain control coding for the PID filter may be based on elimination of the dead band effect. FIGS. 5A and 5B illustrate the dead band effect and two approaches to eliminating the dead band. If the design allows the scaled error value to be zero, when the control loop operates inside the zero-error-bin, there is no correcting information sent to the loop because scaled error value is 0. This effectively opens the loop, causing the output to float between two voltage limits as illustrated in FIG. 5A, an undesirable effect that should be eliminated.

Eliminating the zero-error bin (not permitting the scaled error value to equal 0), and thus eliminating the dead-band as shown in FIG. 5B, can create a large discontinuity near the center of conversion that causes high jitter. The derivative path within a proportional-integral-derivative (PID) filter suffers the most from such jitter because large differences between consecutive samples (i.e., e[n]−e[n−1]) create undesirable large phase jumps.

Figure 5C:
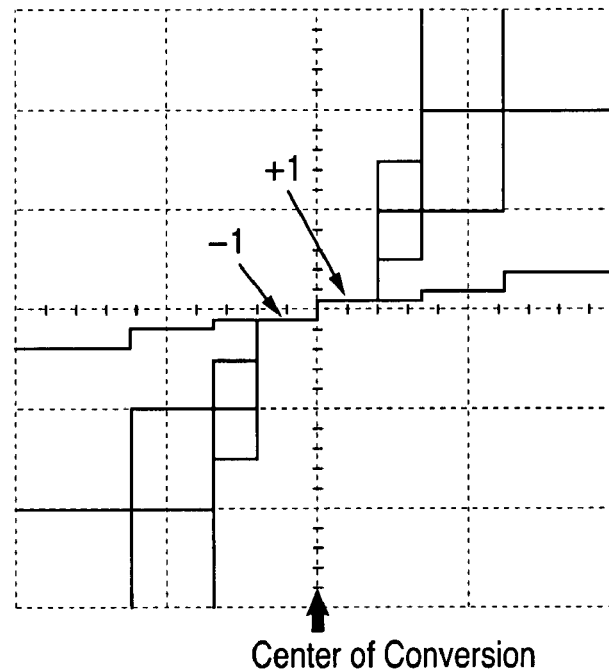
FIG. 5C illustrates a technique for eliminating the dead band effect in a control loop according to one embodiment of the invention.

FIG. 5C illustrates a technique for eliminating the dead band effect in a control loop employing a PID filter according to one embodiment of the invention. Forcing the value of Kx·e[n] to ±1 in the region around zero can eliminate the dead-band. Because of these non-zero values, the loop is forced to track a single voltage point near the center of conversion between 1 and −1, providing desirable "knife-edge" tracking behavior that allows the regulator to exhibit tight output voltage tolerance. As a result, the output voltage uncertainties due to dead-band effect no longer exist. In addition, the ±1 steps provide two intermediate steps which break large derivative steps into smaller steps, a cost-effective and desirable solution to achieve good quiescent performance with a low-resolution ADC and PID filter combination. Scaled error values Kx·e[n] of ±1 are merely exemplary, and other values may be employed (e.g., ±2).

Coding for control of a bit shifter within a Mux-PID (as disclosed in the related application identified above) to eliminate the dead-band may be illustrated by the following:

// Note: deadband_forced_value is for setting Kx·e[n]·SHFx which is a shifted
// version of Kx·e[n]
switch (PID_filter_state)// check state of Mux-PID filter
{case 1: deadband_forced_value=32; break; // derivative: 2× of proportional
case 2: deadband_forced_value=32; break; // derivative: 2× of proportional
case 3: deadband_forced_value=16; break; // proportional: 1×
case 4: deadband_forced_value=0; break; // integral: disabled
}

The derivative and proportional forced values are 32 and 16, respectively (also merely exemplary). After removing the 4 least significant bits (LSBs), the effective derivative value is 2 (or 32/16) and the effective proportional value is 1 (or 16/16). Note that a fixed 2-to-1 gain ratio provides stable operation over a wide range of loop designs because stability margin increases at low loop-gain levels (i.e., Kx·e[n]=±1). If a higher ratio is desired for any reason, values of 3 and higher can be used. An integral to proportional gain ratio of less than 1 is normally required for loop stability. Since the smallest integer of 1 is used for the proportional value, there is no other smaller integer available for the integral. Adding hardware bits or increasing resolution can solve this problem. A simple solution is to disable the integral by setting deadband_forced_value to 0 for integral computation, which results in the control loop exhibiting only insignificant performance degradation when operating inside the dead-band region.

Figure 6:
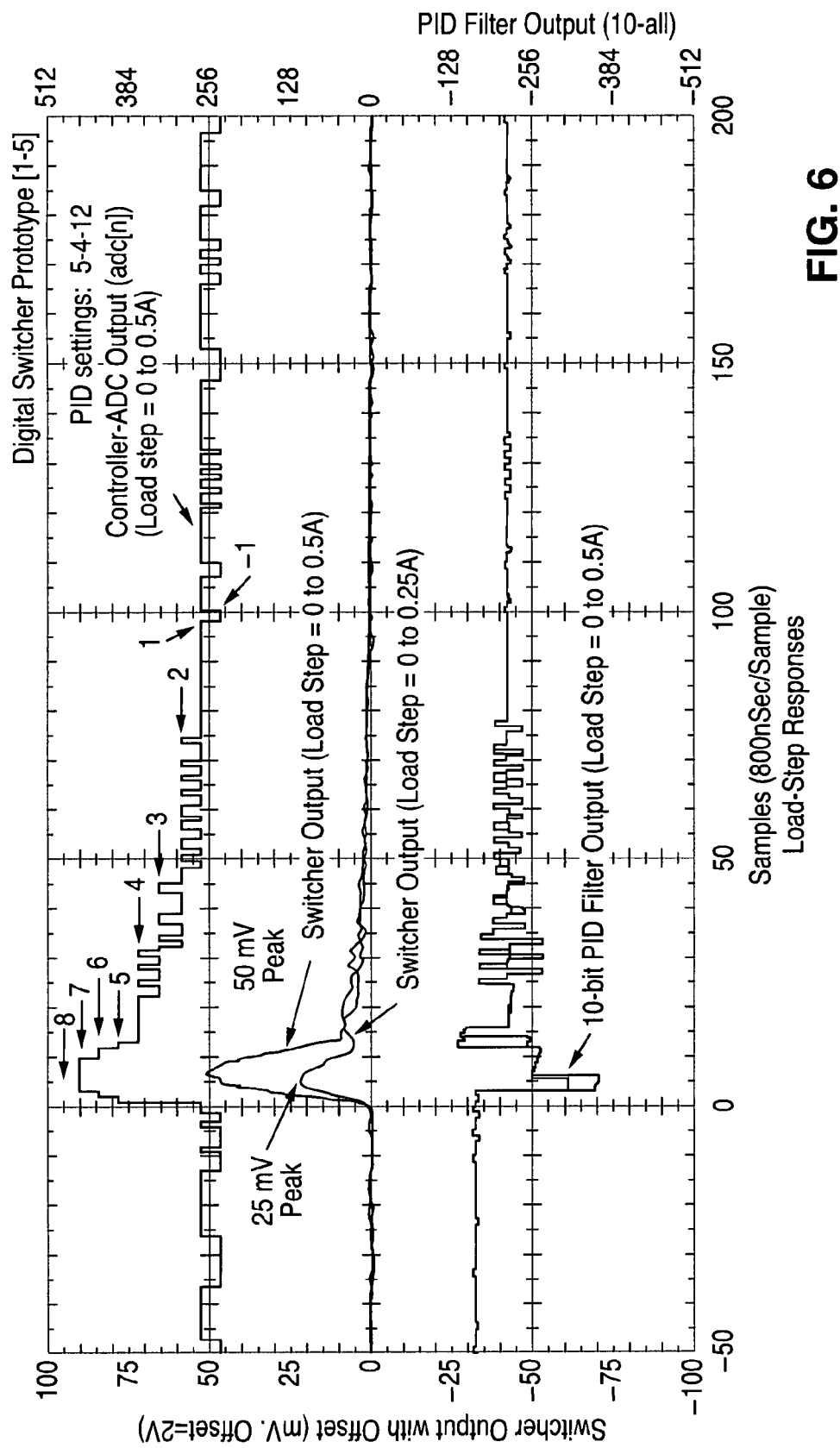
FIG. 6 is a plot illustrating load step response and reference step response in a multiplexed digital PID filter coded to eliminate the dead-band effect according to one embodiment of the present invention.

FIG. 6 is a plot illustrating load step response and reference step response in a multiplexed digital PID filter coded to eliminate the dead-band effect according to one embodiment of the present invention.

The Mux-PID hardware and coding combination described above provides a high performance solution for implementing digital power controllers. Featuring a programmable PID gain control at a fractional cost of conventional approaches, the design also provides good tracking and good transient loop performances with a low-cost and low-resolution ADC and PID filter.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:
1. A proportional-integral-derivative filter comprising:
an input configured to receive error signal samples; and proportional, integral and derivative computation paths configured to respectively apply a proportional gain Kp, an integral gain Ki, and a derivative gain Kd to each received error signal sample, wherein at least one of the proportional, integral and derivative gains is one or more of: scaled across a range of error values and remapped across the range of error values.

2. The proportional-integral-derivative filter according to claim 1, wherein the at least one of the proportional, integral and derivative gains includes a series of values starting with a first value and including a plurality of other values each both successively higher than a previous value and corresponding to a larger range of error values than the previous value.

3. The proportional-integral-derivative filter according to claim 1, wherein the at least one of the proportional, integral and derivative gains includes a series of values starting with a first value and including a plurality of other values, wherein the first value and the other values are each selected based on a magnitude of the received error signal samples.

4. The proportional-integral-derivative filter according to claim 3, wherein the first value and the other values are selected to provide large code-dynamic-range.

5. The proportional-integral-derivative filter according to claim 3, wherein the first value and the other values are selected to provide small code-step ratio.

6. The proportional-integral-derivative filter according to claim 3, wherein the first value and the other values are selected to provide large gain control range through products of the proportional, integral and derivative gains.

7. The proportional-integral-derivative filter according to claim 3, wherein the first value and the other values are selected to provide positive and negative code symmetry.

8. The proportional-integral-derivative filter according to claim 3, wherein the first value and the other values are selected to exclude zero and provide a step increment about zero.

9. The proportional-integral-derivative filter according to claim 3, wherein the first value and the other values are selected to reserve code space for dead band elimination.

10. The proportional-integral-derivative filter according to claim 3, further comprising:
a bit shifter configured to selectively force values of a scaled error signal near zero to either +1 or −1.

11. The proportional-integral-derivative filter according to claim 3, wherein the first value and the other values are selected to allocate code space for prevention of overflow/underflow during multiplying and bit-shifting.

12. A method of operating a proportional-integral-derivative filter comprising:
receiving error signal samples; and
applying a proportional gain Kp, an integral gain Ki, and a derivative gain Kd, by respective proportional, integral and derivative computation paths, to each received error signal sample, wherein at least one of the proportional, integral and derivative gains is one or more of: scaled across a range of error values and remapped across the range of error values.

13. The method according to claim 12, wherein the at least one of the proportional, integral and derivative gains includes a series of values starting with a first value and including a plurality of other values each both successively higher than a previous value and corresponding to a larger range of error values than the previous value.

14. The method according to claim 12, wherein the at least one of the proportional, integral and derivative gains includes a series of values starting with a first value and including a plurality of other values, wherein the first value and the other values are each selected based on a magnitude of the received error signal samples.

15. The method according to claim 14, wherein the first value and the other values are selected to provide large code-dynamic-range.

16. The method according to claim 14, wherein the first value and the other values are selected to provide small code-step ratio.

17. The method according to claim 14, wherein the first value and the other values are selected to provide large gain control range through products of the proportional, integral and derivative gains.

18. The method according to claim 14, wherein the first value and the other values are selected to provide positive and negative code symmetry.

19. The method according to claim 14, wherein the first value and the other values are selected to exclude zero and provide a step increment about zero.

20. The method according to claim 14, wherein the first value and the other values are selected to reserve code space for dead band elimination.

21. The method according to claim 14, further comprising:
selectively forcing values of a scaled error signal near zero to either +1 or −1.

22. The method according to claim 14, wherein the first value and the other values are selected to allocate code space for prevention of overflow/underflow during multiplying and bit-shifting.

23. A system comprising:
an error detector configured to compute a difference between a reference level signal and a feedback signal and generate an error signal sample; and
a proportional-integral-derivative filter, the proportional-integral-derivative filter comprising:
an input configured to receive the error signal sample; and
proportional, integral and derivative computation paths configured to respectively apply a proportional gain Kp, an integral gain Ki, and a derivative gain Kd to each received error signal sample, wherein at least one of the proportional, integral and derivative gains is one or more of: scaled across a range of error values and remapped across the range of error values.

* * * * *